US011041412B2

(12) United States Patent
Asahi et al.

(10) Patent No.: US 11,041,412 B2
(45) Date of Patent: Jun. 22, 2021

(54) VALVE TIMING CONTROLLER

(71) Applicant: AISIN SEIKI KABUSHIKI KAISHA, Kariya (JP)

(72) Inventors: Takeo Asahi, Kariya (JP); Yuji Noguchi, Kariya (JP); Kazuo Ueda, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 26 days.

(21) Appl. No.: 16/676,096

(22) Filed: Nov. 6, 2019

(65) Prior Publication Data

US 2020/0141289 A1 May 7, 2020

(30) Foreign Application Priority Data

Nov. 7, 2018 (JP) .............................. JP2018-209553

(51) Int. Cl.
*F01L 1/344* (2006.01)
*F16K 11/078* (2006.01)
*F16K 11/076* (2006.01)

(52) U.S. Cl.
CPC .......... *F01L 1/3442* (2013.01); *F16K 11/078* (2013.01); *F01L 2001/3443* (2013.01);
(Continued)

(58) Field of Classification Search
CPC ... F01L 2001/34426; F01L 2001/34469; F01L 2001/3443; F01L 2001/34433;
(Continued)

(56) References Cited

U.S. PATENT DOCUMENTS 8,534,246 B2 * 9/2013 Lichti .................. F01L 1/3442
123/90.17
8,677,956 B2 * 3/2014 Chang ...................... F01L 1/34
123/90.12
(Continued)

FOREIGN PATENT DOCUMENTS

DE        10346448 A1 *  6/2005  ............ F01L 1/3442

OTHER PUBLICATIONS

U.S. Appl. No. 16/676,171, filed Nov. 6, 2019, Takeo Asahi et al.
U.S. Appl. No. 16/426,480, filed May 30, 2019, Sakaguchi et al.

*Primary Examiner* — Patrick Hamo
*Assistant Examiner* — Wesley G Harris
(74) *Attorney, Agent, or Firm* — Buchanan Ingersoll & Rooney PC

(57) ABSTRACT

A valve timing controller includes: a driving-side rotating body rotating in synchronization with a crankshaft of an internal combustion engine; a driven-side rotating body disposed coaxially with a rotation axis of the driving-side rotating body and rotating integrally with a valve opening and closing camshaft; advancing and retarding chambers formed between the driving-side and driven-side rotating bodies; a control valve unit controlling supply and discharge of a fluid to and from the advancing and retarding chambers; and a check valve unit disposed upstream of the control valve unit in a supply flow passage. A pressure space is provided between the control valve and check valve units, the control valve unit has a flow passage structure, and the check valve unit includes a supply flow passage and a return check valve.

9 Claims, 12 Drawing Sheets

(52) U.S. Cl.
CPC ............... *F01L 2001/34423* (2013.01); *F01L 2001/34426* (2013.01); *F01L 2001/34433* (2013.01); *F01L 2001/34469* (2013.01); *F16K 11/076* (2013.01)

(58) Field of Classification Search
CPC ............. F01L 1/3442; F01L 1/344; F01L 2001/34423; F01L 2001/34453; F01L 2001/34483; F01L 1/022; F01L 1/34; F16K 11/078; F16K 11/076
USPC ................................ 123/90.15, 90.16, 90.17
See application file for complete search history.

(56) References Cited

U.S. PATENT DOCUMENTS

| | | | |
|---|---|---|---|
| 9,046,181 B2 * | 6/2015 | Patzold | F16K 15/14 |
| 10,273,835 B2 * | 4/2019 | Kajita | F01L 1/3442 |
| 2003/0033998 A1 * | 2/2003 | Gardner | F01L 1/344 |
| | | | 123/90.17 |
| 2010/0186697 A1 * | 7/2010 | Suzuki | F01L 1/3442 |
| | | | 123/90.17 |
| 2013/0068184 A1 * | 3/2013 | Tada | F01L 1/3442 |
| | | | 123/90.17 |
| 2015/0300212 A1 * | 10/2015 | Bayrakdar | F01L 1/3442 |
| | | | 123/90.15 |
| 2017/0058726 A1 | 3/2017 | Smith et al. | |
| 2017/0058727 A1 * | 3/2017 | Smith | F01L 1/047 |
| 2017/0198612 A1 * | 7/2017 | Noguchi | F01L 1/047 |
| 2017/0260882 A1 * | 9/2017 | Brower | F16K 15/026 |
| 2018/0100595 A1 * | 4/2018 | Fanzani | F16K 15/144 |
| 2018/0363514 A1 * | 12/2018 | Stanhope | F01L 1/3442 |
| 2019/0153910 A1 * | 5/2019 | Asahi | F01L 1/3442 |
| 2019/0234244 A1 * | 8/2019 | Hisaeda | F01L 1/022 |
| 2020/0011214 A1 | 1/2020 | Sakaguchi et al. | |

* cited by examiner

VALVE TIMING CONTROLLER

CROSS REFERENCE TO RELATED APPLICATIONS

This application is based on and claims priority under 35 U.S.C. § 119 to Japanese Patent Application 2018-209553, filed on Nov. 7, 2018, the entire contents of which are incorporated herein by reference.

TECHNICAL FIELD

This disclosure relates to a valve timing controller for controlling opening and closing timing of a valve by supplying or discharging a fluid to or from an advancing chamber or a retarding chamber between a driving-side rotating body and a driven-side rotating body.

BACKGROUND DISCUSSION

US Patent Application Publication No. 2017/0058726 (Reference 1) discloses, as a valve timing controller, a technology including a control valve that supplies a fluid to one of an advancing chamber and a retarding chamber and operates the fluid from the other one of the advancing chamber and the retarding chamber by a spool manipulation, and a check valve that supplies, to the advancing chamber, a part of the fluid returning from the retarding chamber when the fluid is supplied to the advancing chamber.

US Patent Application Publication No. 2015/0300212 (Reference 2) discloses a technology which includes a flow passage configuration for supplying a fluid to one of two chambers under a control of a control valve, and a check valve provided in an opening portion through which the fluid is supplied to the control valve, and in which the check valve is formed with a plate having an opening, a closing portion capable of closing the opening, and a portion of a spring that supports the opening, by a spring plate.

As disclosed in Reference 1, in a valve timing controller in which a spool is disposed coaxially with a rotary shaft core, a check valve is provided inside the spool. When a fluid is supplied to an advancing chamber by manipulating the spool, a part of the fluid returning from a retarding chamber is supplied to the advancing chamber through the check valve, leading to an increase in the size and complexity of the spool.

Therefore, the check valve is configured as in a technology disclosed in Reference 2. However, in Reference 2, since the valve body and the spring body are integrally formed, a space can be reduced in an operation direction of the valve body. However, since the spring body protrudes outward from the outer periphery of the valve body, an increase in the size of the check valve is caused.

Thus, a need exists for a valve timing controller which is not susceptible to the drawback mentioned above.

SUMMARY

A feature of a valve timing controller according to an aspect of this disclosure resides in that the valve timing controller includes: a driving-side rotating body that rotates in synchronization with a crankshaft of an internal combustion engine; a driven-side rotating body that is disposed coaxially with a rotation axis of the driving-side rotating body and rotates integrally with a valve opening and closing camshaft; an advancing chamber and a retarding chamber formed between the driving-side rotating body and the driven-side rotating body; a control valve unit that controls supply and discharge of a fluid to and from the advancing chamber and the retarding chamber; and a check valve unit that is disposed upstream of the control valve unit in a supply flow passage through which the fluid is supplied to the control valve unit, in which, a pressure space is provided between the control valve unit and the check valve unit, the control valve unit has a flow passage structure in which a spool is accommodated to be movable coaxially with the rotation axis, and when the spool is manipulated, while the fluid is supplied to one of an advancement port and a retardation port, the fluid returning from the other one of the advancement port and the retardation port is discharged to the outside, and at the same time, at least a part of the fluid to be discharged to the outside is supplied to the pressure space, and the check valve unit includes, therein, a supply flow passage through which the fluid from a fluid source is supplied to the control valve unit, and includes a return check valve which enables supply of the fluid in the pressure space to the supply flow passage in the check valve unit as the pressure of the pressure space increases.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
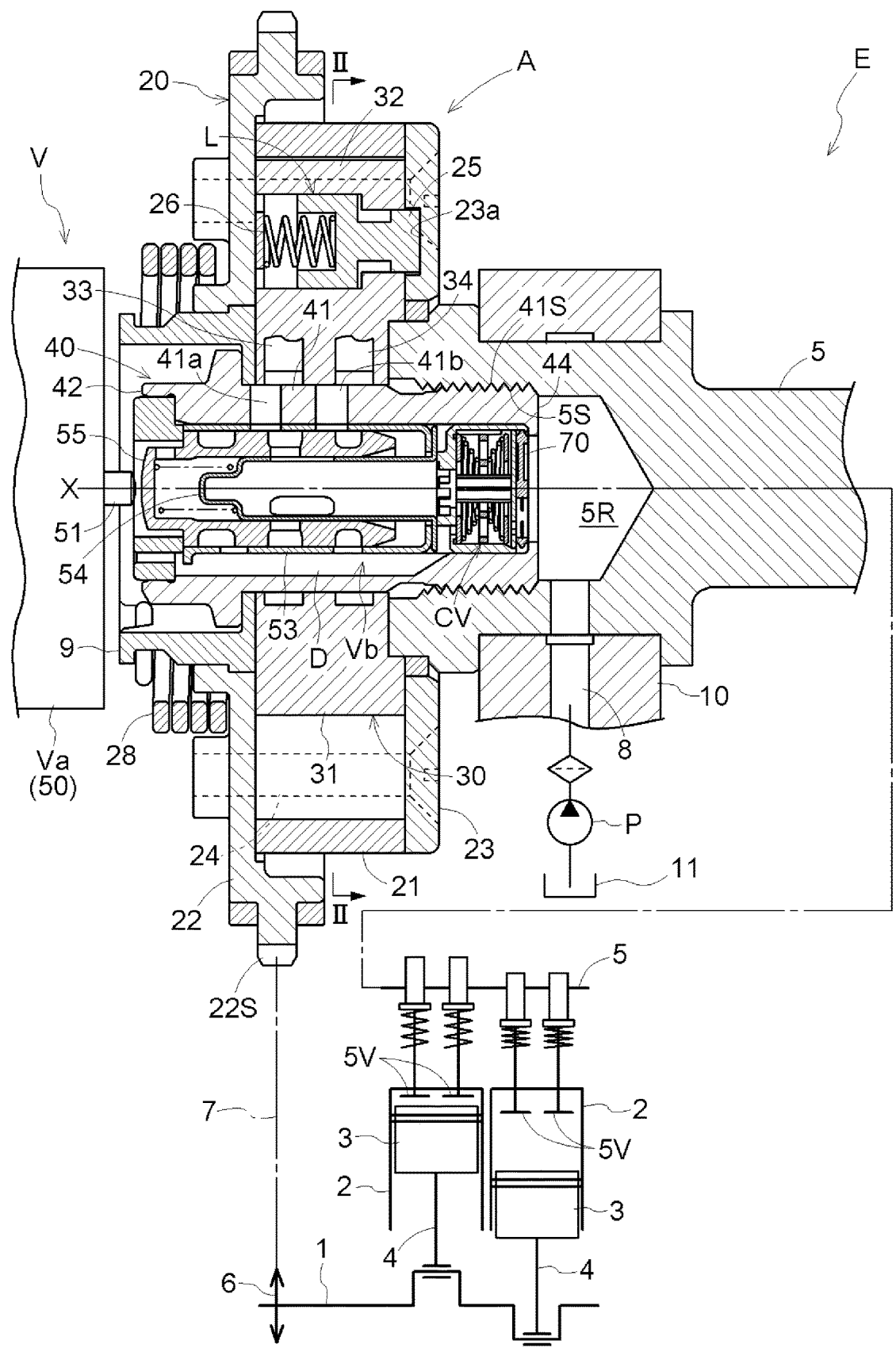
FIG. 1 is a sectional view illustrating the entire configuration of a valve timing controller.
Figure 2:
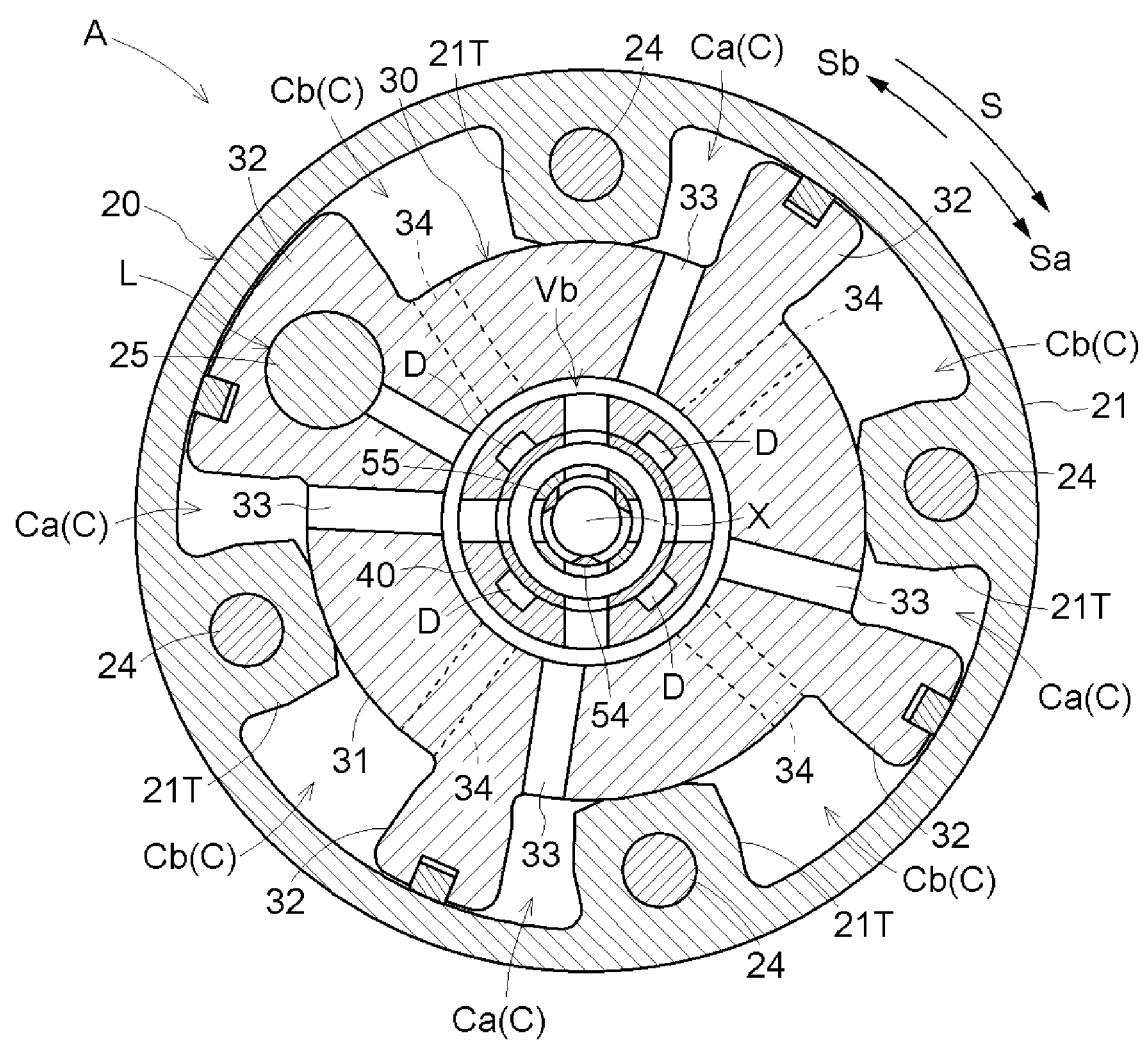
FIG. 2 is a cross-sectional view taken along line II-II of FIG. 1.
Figure 3:
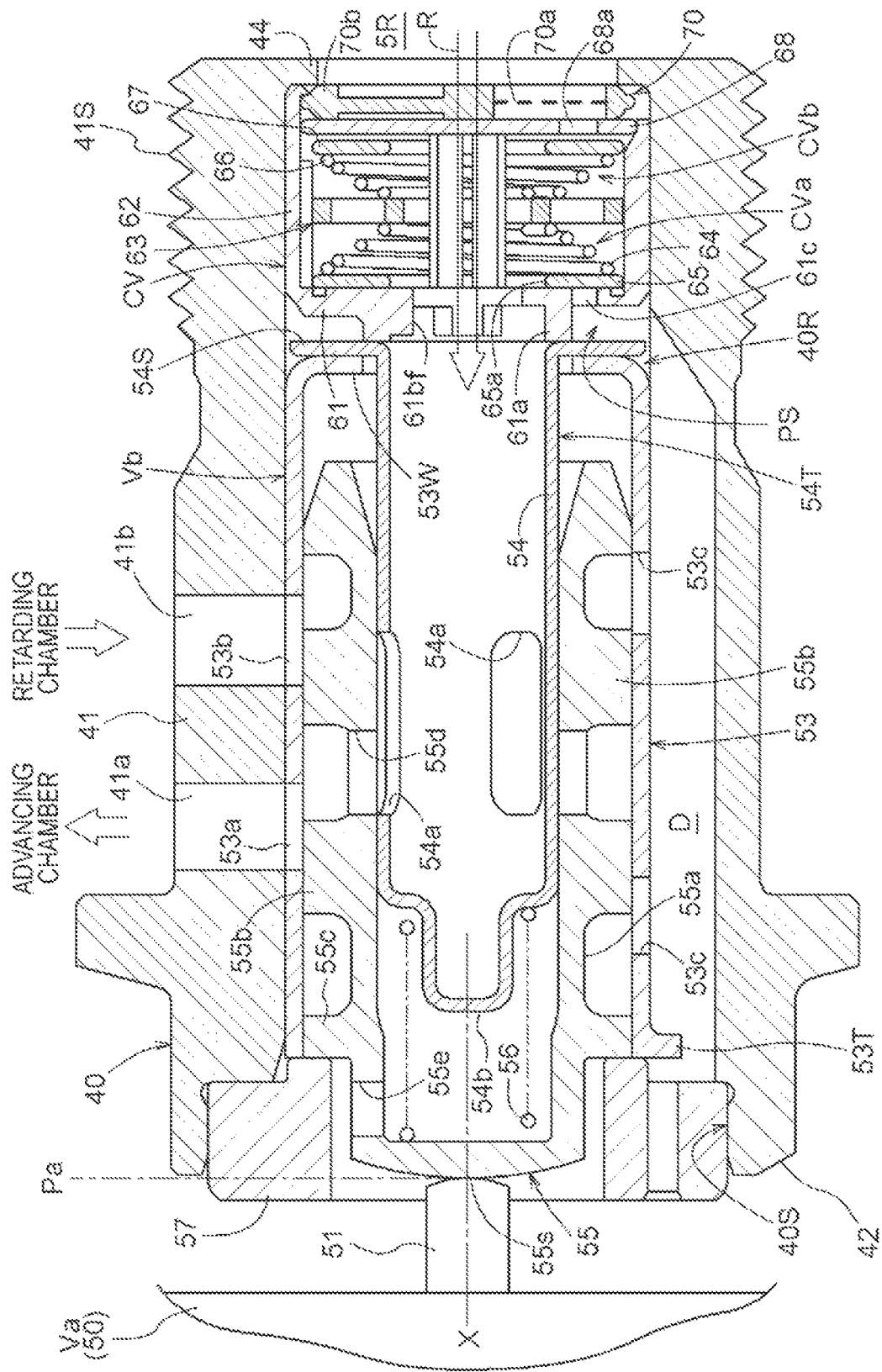
FIG. 3 is a sectional view illustrating a valve unit in which a spool is in an advancement position.

Hereinafter, an embodiment of this disclosure will be described with reference to the accompanying drawings.
Basic Configuration As illustrated in FIGS. 1 to 3, a valve timing controller A is configured which includes an external rotor 20 as a driving-side rotating body, an internal rotor 30 as a driven-side rotating body, and an electromagnet control valve V that controls hydraulic oil as a fluid.

In the valve timing controller A, the external rotor 20 includes the internal rotor 30, and the internal rotor 30 is relatively rotatably supported on the external rotor 20.

As a detailed configuration, the internal rotor 30 (an example of a driven-side rotating body) is disposed coaxially with a rotation axis X of an intake camshaft 5 for opening and closing a valve, and is connected to the intake camshaft 5 by a connection bolt 40 to rotate integrally with the intake camshaft 5. Further, the external rotor 20 (an example of a driving-side rotating body) is disposed coaxially with the rotation axis X to rotate synchronously with a crankshaft 1 of an engine E as an internal combustion engine.

An electromagnetic control valve V includes an electromagnetic unit Va supported on the engine E, and a control valve unit Vb accommodated in an internal space 40R of the connection bolt 40. In particular, a check valve unit CV is disposed on an upstream side (right side in FIG. 1) of the hydraulic oil in a supply direction by the control valve unit Vb in the internal space of the connection bolt 40.

The electromagnetic unit Va includes a solenoid unit 50 and a plunger 51. The plunger 51 is disposed coaxially with the rotation axis X to perform arrival/leaving under a control of the solenoid unit 50. In the control valve unit Vb, a spool 55 that controls supply and discharge of the hydraulic oil (an example of a fluid) is disposed coaxially with the rotation axis X.

Figure 4:
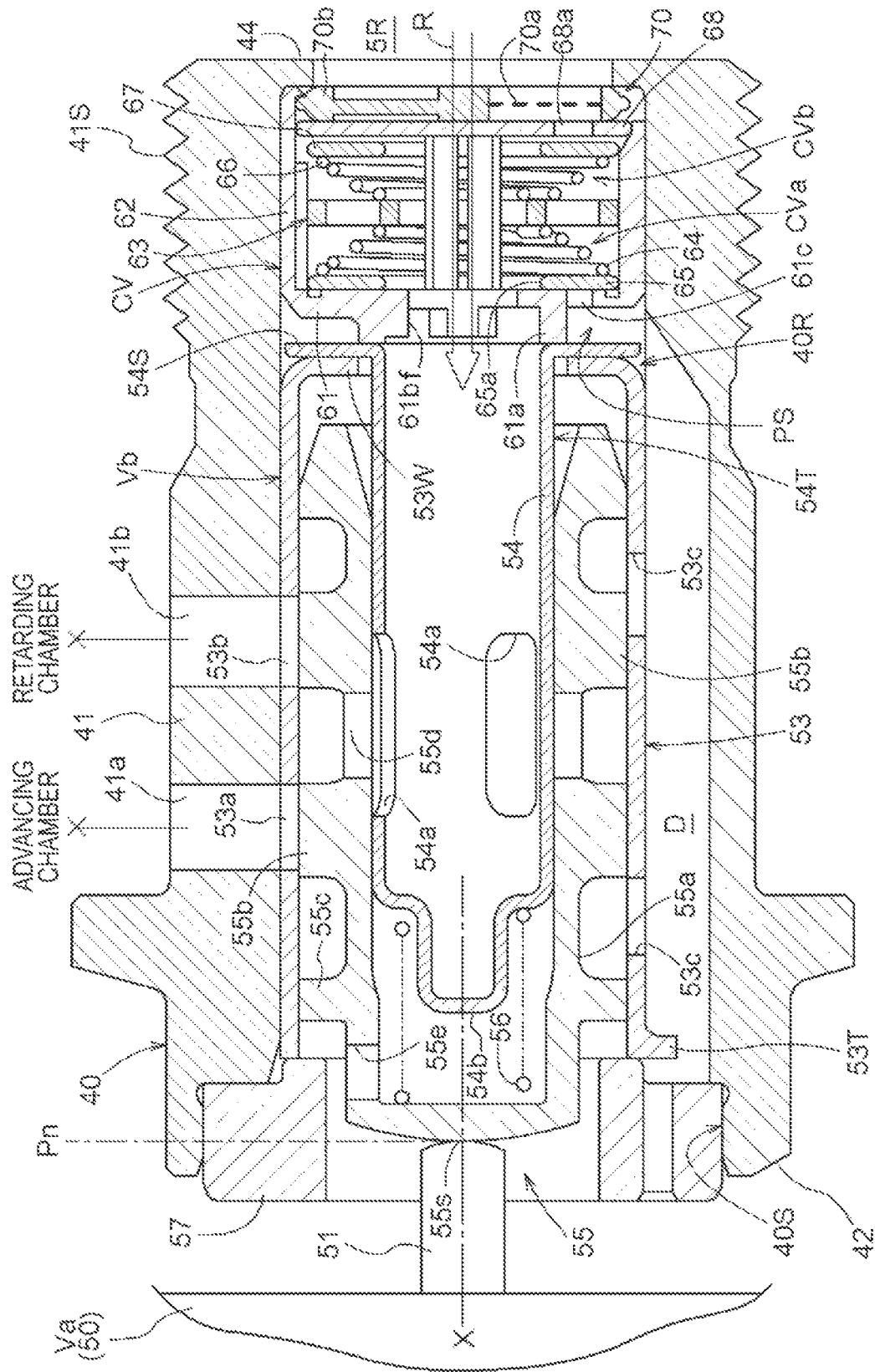
FIG. 4 is a sectional view illustrating the valve unit in which the spool is in a neutral position.
Figure 5:
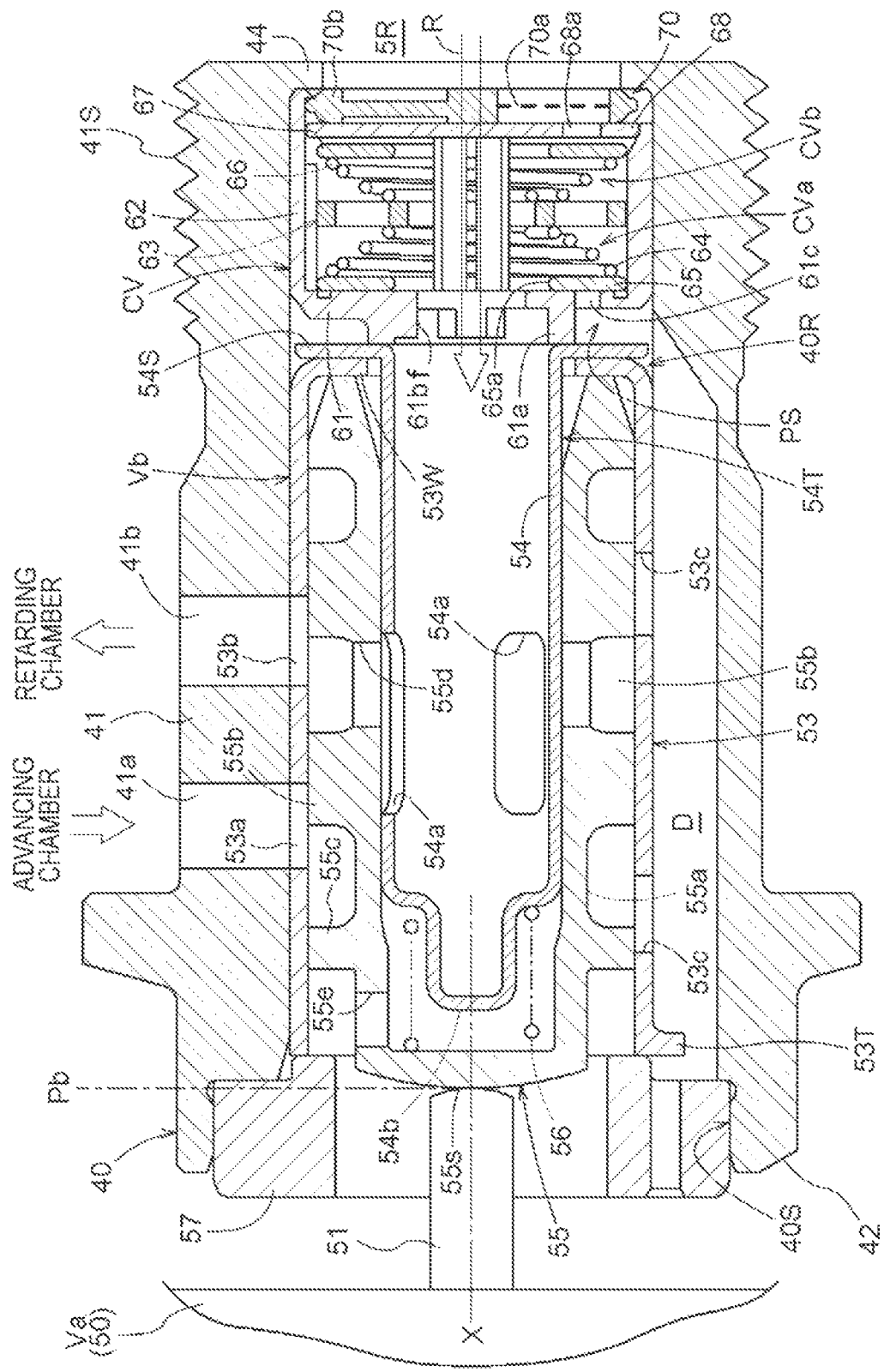
FIG. 5 is a sectional view illustrating the valve unit in which the spool is in a retardation position.

From this configuration, the projecting amount of the plunger 51 is set by controlling electric power supplied to the solenoid unit 50, and the spool 55 is manipulated along the rotation axis X as the plunger 51 abuts on the spool 55 (see FIGS. 3 to 5). As a result, the hydraulic oil is controlled by the spool 55, a relative rotational phase between the external rotor 20 and the internal rotor 30 is determined, and an opening and closing timing of an intake valve 5V is controlled. A configuration of the electromagnetic control valve V and a control mode of the hydraulic oil will be described below.

The engine E (an example of an internal combustion engine) of FIG. 1 is provided in a vehicle such as a passenger car. The engine E is configured in a four-cycle type in which a piston 3 is accommodated inside a cylinder bore of a cylinder block 2 at an upper position and the piston 3 and the crankshaft 1 are connected to each other by a connecting rod 4. An upper portion of the engine E is provided with the intake camshaft 5 that opens and closes the intake valve 5V and an exhaust camshaft that is not illustrated.

A pump flow passage 8 for supplying the hydraulic oil from a hydraulic pump P (an example of a fluid source) driven by the engine E is formed in an engine constituting member 10 that rotatably supports the intake camshaft 5. The hydraulic pump P supplies lubricating oil stored in an oil pan 11 of the engine E as the hydraulic oil (an example of a fluid) from the pump flow passage 8 to the check valve unit CV and the control valve unit Vb in the order thereof.

As illustrated in FIG. 1, a timing chain 7 is wound on an output sprocket 6 formed in the crankshaft 1 of the engine E and a timing sprocket 22S of the external rotor 20. As a result, the external rotor 20 rotates in synchronization with the crankshaft 1. A sprocket is also provided at a front end of the exhaust camshaft on an exhaust side, and the timing chain 7 is also wound on this sprocket.

As illustrated in FIG. 2, the external rotor 20 rotates in a driving rotational direction S by a driving force from the crankshaft 1. A direction in which the internal rotor 30 rotates relative to the external rotor 20 in the same direction as the driving rotational direction S is referred to as an advancing direction Sa, and an opposite direction thereto is referred to as a retarding direction Sb. A relationship between the crankshaft 1 and the intake camshaft 5 is set in the valve timing controller A in order to increase an intake compression ratio as a displacement amount increases when the relative rotational phase is displaced in the advancing direction Sa and decrease the intake compression ratio as the displacement amount decreases when the relative rotational phase is displaced in the retarding direction Sb.

In this embodiment, the valve timing controller A included in the intake camshaft 5 is illustrated. However, the valve timing controller A may be included in the exhaust camshaft. Further, the valve timing controller A may be included in both the intake camshaft 5 and the exhaust camshaft.

As illustrated in FIGS. 1 and 2, the external rotor 20 has an external rotor body 21, a front plate 22, and a rear plate 23, which are integrated by fastening a plurality of fastening bolts 24. The timing sprocket 22S is formed on an outer periphery of the front plate 22. Further, an annular member 9 is fitted in the inner periphery of the center of the front plate 22, and a bolt head portion 42 of the connection bolt 40 is crimped to the annular member 9, so that the annular member 9, an internal rotor body 31, and the intake camshaft 5 are integrated.

As illustrated in FIG. 2, a plurality of projecting portions 21T projecting inward in a radial direction are integrally formed in the external rotor body 21. The internal rotor 30 has the cylindrical internal rotor body 31 which comes into contact with the projecting portions 21T of the external rotor body 21, and four vane portions 32 projecting radially outward from the outer periphery of the internal rotor body 31 to be in contact with the inner peripheral surface of the external rotor body 21.

In this way, the external rotor 20 includes the internal rotor 30, a plurality of fluid pressure chambers C are formed on the outer peripheral side of the internal rotor body 31 at an intermediate position between the projecting portions 21T adjacent to each other in a rotation direction, and the fluid pressure chambers C are partitioned by the vane portions 32 so that advancing chambers Ca and retarding chambers Cb are partitioned. Further, the internal rotor 30 is formed with advancement flow passages 33 communicating with the advancing chambers Ca and retardation flow passages 34 communicating with the retarding chambers Cb.

As illustrated in FIG. 1, a torsion spring 28 that assists displacement in the advancing direction Sa by applying an urging force from the most retarded phase in the advancing direction Sa to the relative rotational phase between the external rotor 20 and the internal rotor 30 (hereinafter, referred to as a relative rotational phase) is provided over the external rotor 20 and the annular member 9.

As illustrated in FIGS. 1 and 2, the valve timing controller A is provided with a lock mechanism L that holds the relative rotational phase between the external rotor 20 and the internal rotor 30 at the most retarded phase. The lock mechanism L includes a lock member 25 that is supported to be advanced and retarded along the rotation axis X with respect to one vane portion 32, a lock spring 26 that projects from and urges the lock member 25, and a lock recessed portion 23a that is formed in the rear plate 23. The lock mechanism L may be configured to guide the lock member 25 to move along the radial direction.

In the lock mechanism L, when the relative rotational phase reaches the most retarded phase, the lock member 25 is engaged with the lock recessed portion 23a by an urging force of the lock spring 26 to reach a locked state. Further, when the hydraulic oil is supplied to the advancement flow passages 33 in a situation in which the lock mechanism L is in a lock state, the lock mechanism L applies the pressure of the hydraulic oil of the advancement flow passages 33 in an unlocking direction to release the locked state.

Connection Bolt

As illustrated in FIG. 1 and FIGS. 3 to 5, in the connection bolt 40, the bolt head portion 42 is formed at an outer end portion (a left end portion of FIG. 3 and a side facing the electromagnetic unit Va) of a bolt body 41 that is cylindrical as a whole. Further, a male screw portion 41S is formed on the outer periphery of the inner end portion of the bolt body 41 on an opposite side to the bolt head portion 42.

As illustrated in FIGS. 3 to 5, the connection bolt 40 is formed in the cylindrical internal space 40R that is disposed coaxially with the rotation axis X and is penetrated along the rotation axis X. A regulation wall 44 projecting in a direction in which the regulation wall 44 approaches the rotation axis X is formed on the inner end side (a right end portion of FIG. 3) along the rotation axis X among the inner peripheral surface of the internal space 40R.

Further, a connection fitting portion 40S having a larger diameter than the internal space 40R is formed on the inner periphery of the bolt head portion 42 of the connection bolt 40.

Accordingly, the check valve unit CV and the control valve unit Vb are inserted into the internal space 40R of the connection bolt 40 from an opening opened by the bolt head portion 42, and a fixing ring 57 is press-fitted and fixed to the connection fitting portion 40S, so that the check valve unit CV, the control valve unit Vb, and the fixing ring 57 are held inside the internal space 40R.

As illustrated in FIG. 1, the intake camshaft 5 is formed with a shaft inner space 5R centered on the rotation axis X, and the shaft inner space 5R communicates with the above-described pump flow passage 8.

With this configuration, the check valve unit CV and the control valve unit Vb are accommodated in the internal space 40R of the bolt body 41. Then, in a state in which the bolt body 41 communicates with the annular member 9, the external rotor 20, and the internal rotor 30, the male screw portion 41S is screwed into a female screw portion 5S of the intake camshaft 5, and the bolt head portion 42 is rotated, so that the internal rotor 30 is fastened to the intake camshaft 5.

By this fastening, the annular member 9 and the internal rotor 30 can be fixed to the intake camshaft 5, and the hydraulic oil from the shaft inner space 5R can be supplied to the check valve unit CV and the control valve unit Vb inside the connection bolt 40.

As illustrated in FIGS. 1 to 5, the bolt body 41 includes an advancement port 41a communicating with the advancement flow passages 33 and a retardation port 41b communicating with the retardation flow passages 34, which are formed in a through-hole shape extending from the outer peripheral surface of the bolt body 41 to the internal space 40R. A plurality of (four) drain grooves D that reach the connection fitting portion 40S at an outer end from the vicinity of an inner end of the connection bolt 40 are formed on the inner periphery of the connection bolt 40 in a posture along the rotation axis X. The plurality of drain grooves D communicate with the outside of the bolt body 41 through a communication space formed in the fixing ring 57.

Control Valve Unit

As illustrated in FIGS. 3 to 5 and 7, the control valve unit Vb includes a sleeve 53, a fluid supply pipe 54, the spool 55, and a spool spring 56 in the internal space 40R of the connection bolt 40.

The sleeve 53 is cylindrical as a whole and is fitted in the inner peripheral surface of the bolt body 41 among the internal space 40R of the connection bolt 40. The fluid supply pipe 54 is disposed coaxially with the rotation axis X in the internal space 40R. The spool 55 is disposed to be movable between the inner peripheral surface of the sleeve 53 and the outer peripheral surface of a pipe line portion 54T of the fluid supply pipe 54 along the rotation axis X. A spool spring 56 is provided between the fluid supply pipe 54 and the spool 55 to urge the spool 55 in a projection direction.

The sleeve 53 is formed with a plurality of advancement communication holes 53a that allow the advancement port 41a to communicate with the internal space 40R, a plurality of retardation communication holes 53b that allow the retardation port 41b to communicate with the internal space 40R, and a plurality of drain holes 53c that discharge the hydraulic oil of the internal space 40R to the outer surface side of the sleeve 53.

The advancement communication holes 53a and the retardation communication holes 53b are arranged at four locations in a circumferential direction. The drain holes 53c are arranged at four locations in the circumferential direction in which the drain holes 53c have phases different from the advancement communication holes 53a and the retardation communication holes 53b on the outer end side and the inner end side of the sleeve 53.

As illustrated in FIGS. 3 to 5, a plurality of engagement protrusions 53T projecting outward in a posture intersecting a direction along the rotation axis X from the outer periphery are formed on the outer end side of the sleeve 53. Further, a flange-like end portion wall 53W protruding outward is formed on the inner end side of the sleeve 53 by drawing or the like.

With this configuration, by fitting the engagement protrusions 53T of the sleeve 53 in predetermined fitting portions on the inner peripheral surface of the bolt body 41, a state is maintained in which the advancement communication holes 53a communicate with the advancement port 41a, the retardation communication holes 53b communicate with the retardation port 41b, and the drain holes 53c communicate with the drain grooves D.

As illustrated in FIGS. 3 to 5, in the fluid supply pipe 54, a flange-like proximal end portion 54S fitted in the internal space 40R and a pipe line portion 54T extending from the proximal end portion 54S toward the tip end side in the internal space 40R are integrally formed, and a supply port 54a is formed on the outer periphery near the tip end of the pipe line portion 54T. Further, a spring support portion 54b having a small diameter is formed on the outer ends side of the fluid supply pipe 54.

The proximal end portion 54S of the fluid supply pipe 54 is formed not in a circular shape but in an oval shape as viewed in the direction along the rotation axis X. The outer diameter of a portion belonging to the proximal end portion 54S and having the largest diameter is set to be slightly smaller than the inner diameter of the internal space 40R. The proximal end portion 54S may be formed in a disc shape.

The spool 55 has a cylindrical spool body 55a having a closed tip end. A manipulation end portion 55s is formed at the tip end of the spool body 55a. Further, a pair of land portions 55b having a larger diameter than the spool body 55a is formed on the outer periphery of the spool body 55a, and a stopper portion 55c is formed at an outer end position of the spool body 55a.

A plurality of (four) intermediate hole portions 55d communicating with an internal space of the spool body 55a are formed at intermediate positions of the pair of land portions 55b among the spool body 55a. Further, a drain hole portion 55e communicating with the internal space of the spool body 55a is formed on the outer end side of the stopper portion 55c in the spool body 55a.

In the fluid supply pipe 54, the proximal end portion 54S is sandwiched between a projection body 61a of an end wall 61 (an example of a wall body) of the check valve unit CV and the end portion wall 53W of the sleeve 53, so that the position of the fluid supply pipe 54 is determined in the direction along the rotation axis X. In particular, in a state in which the check valve unit CV and the control valve unit Vb are inserted into the internal space 40R of the connection bolt 40, the proximal end portion 54S of the fluid supply pipe 54 and the end portion wall 53W of the sleeve 53 overlap each other. Thus, this portion is sealed and there is no inconvenience that the hydraulic oil flows directly between the inside of the sleeve 53 and the pressure space PS.

The spool spring 56 is a compression coil type, and is interposed between the spring support portion 54b of the fluid supply pipe 54 and the inner side surface of the manipulation end portion 55s in the internal space of the spool 55. Further, in a state in which the electromagnetic unit Va is not driven, as illustrated in FIG. 3, the stopper portion 55c of the spool 55 abuts on the fixing ring 57 due to an urging force of the spool spring 56, and an operation limit in the projection direction of the spool 55 is determined.

Check Valve Unit

As illustrated in FIGS. 3 to 8, the check valve unit CV includes a unit case 60, a return check valve CVa (an example of a check valve) disposed inside the unit case 60, a supply check valve CVb (an example of a check valve), and a filter member 70.

The unit case 60 includes an end wall 61 (an example of a wall body) disposed at an end portion of the unit case 60 and a cylindrical outer wall 62 disposed close to the inner periphery of the internal space 40R of the connection bolt 40.

This unit case 60 constitutes a part of a supply flow passage R through which the hydraulic oil supplied from the shaft inner space 5R is supplied to the control valve unit Vb.

The end wall 61 (a wall body) is disposed at a position where the end wall 61 faces the proximal end portion 54S of the fluid supply pipe 54. The annular projection body 61a projecting toward the proximal end portion 54S is integrally formed at a central position of the end wall 61, and a flow passage hole 61b is formed at a central position surrounded by the projection body 61a. Further, a plurality of return holes 61c are formed in a region surrounding the projection body 61a.

In particular, as the projection body 61a abuts on the proximal end portion 54S of the fluid supply pipe 54, a pressure space PS is formed in an area surrounding the projection body 61a between the control valve unit Vb and the check valve unit CV. This pressure space PS communicates with the drain grooves D. That is, the pressure space PS is disposed between the proximal end portion 54S and the end wall 61 (a wall body) in the internal space 40R of the connection bolt 40, and is formed as an area surrounding the projection body 61a.

A spring receiving member 63 is accommodated inside this unit case 60, and the return check valve CVa is configured by arranging a first spring body 64 and a first valve body 65 on a side (a left side of FIG. 3) on which the electromagnetic unit Va is disposed with reference to the spring receiving member 63. Similarly, the supply check valve CVb is configured by arranging a second spring body 66, a second valve body 67, and a valve seat plate 68 on an opposite side (a right side of FIG. 3) to the return check valve CVa with reference to the spring receiving member 63. A plurality of flow holes 68a are formed in the valve seat plate 68.

In the return check valve CVa, a plate-like material having a first hole portion 65a formed in the center thereof is used as the first valve body 65, and the first valve body 65 is brought into close contact with the inner surface of the end wall 61 by an urging force of the first spring body 64, to close the plurality of return holes 61c, so as to block flow of the hydraulic oil.

In contrast, when the pressure of the pressure space PS rises, the first valve body 65 is separated from the inner surface of the end wall 61 against the urging force of the first spring body 64, to open the return holes 61c, so as to enable flow of the hydraulic oil from the pressure space PS into the unit case 60. With this configuration, a return flow passage is formed in a flow passage through which the hydraulic oil flows from the pressure space PS via the return holes 61c to the supply flow passage R inside the unit case 60.

Further, in the supply check valve CVb, a plate-like material having a second hole portion 67a formed in the center thereof is used as the second valve body 67. When the pressure of the shaft inner space 5R is higher than the pressure on a downstream side (a flow passage on the left side of the supply check valve CVb in FIG. 3) of the supply check valve CVb, the flow holes 68a are opened to allow flow of the hydraulic oil from the shaft inner space 5R into the unit case 60.

In contrast, when the pressure of the shaft inner space 5R is lower than the pressure on the downstream side of the supply check valve CVb or when the pressure on the downstream side of the supply check valve CVb is higher than the pressure of the shaft inner space 5R, the second valve body 67 is brought into close contact with the valve seat plate 68 by an urging force of the second spring body 66, to close the plurality of flow holes 68a, so as to block the flow of the hydraulic oil from the shaft inner space 5R into the unit case 60.

The filter member 70 has a structure in which a metal net body 70a is reinforced with a resin frame 70b, and removes dust contained in the hydraulic oil.

Details of Check Valve Unit

As illustrated in FIGS. 3 to 9, an annular member is arranged at the center of the end wall 61 of the unit case 60 to project outward from the outer surface of the end wall 61, so that the projection body 61a is formed. The plurality of return holes 61c are formed along the outer periphery of the annular member. An internal space of the projection body 61a functions as the supply flow passage R.

Further, an opening portion is formed at an end portion of the outer wall 62 opposite to the end wall 61, and a plurality of engagement claw portions 62a projecting inward in the radial direction are formed at a plurality of locations that equally divide an opening edge of the opening portion. Further, a plurality of protrusions 62b are formed on an inner surface of the outer wall 62 in a posture that is parallel to the rotation axis X with respect to positions that equally divide the inner periphery in the circumferential direction.

Figure 10:
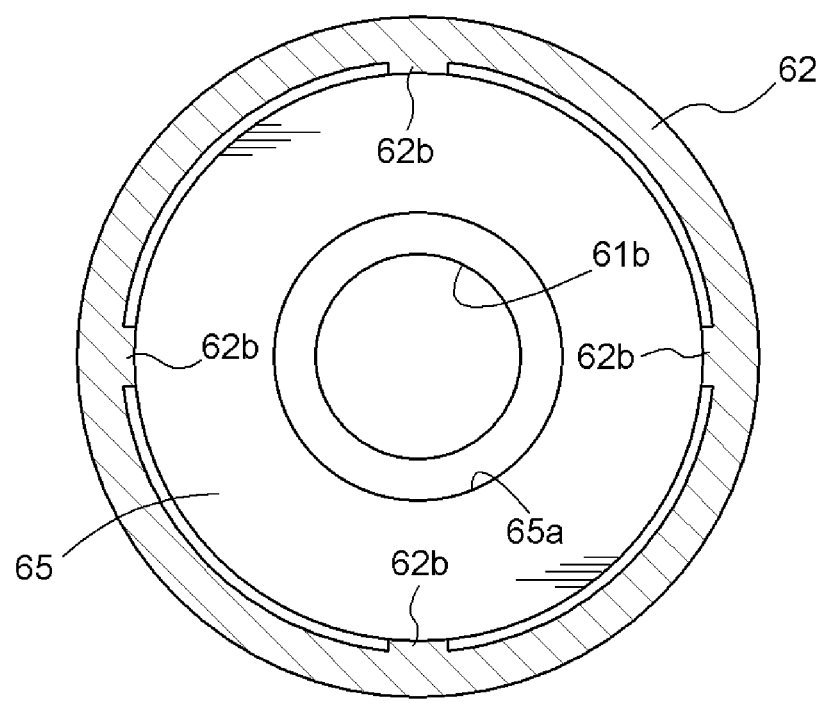
FIG. 10 is a cross-sectional view illustrating a first valve body in the unit case.

The first spring body 64, the first valve body 65, the spring receiving member 63, the second valve body 67, and the valve seat plate 68 are arranged in the unit case 60. In particular, as illustrated in FIG. 10 (only the first valve body 65 is illustrated in the same figure), the first valve body 65 and the second valve body 67 lightly come into contact with projection ends of the plurality of projections 62b to achieve smooth movement in the direction along the rotation axis X.

This unit case 60 has a structure in which the spring receiving member 63 is accommodated therein and end portions of a plurality of (four) leg portions 63c in the form of a rod of the spring receiving member 63 abut on the inner surface of the end wall 61 (the wall body), and the abutment position is an area surrounding the flow passage hole 61b.

Figure 6:
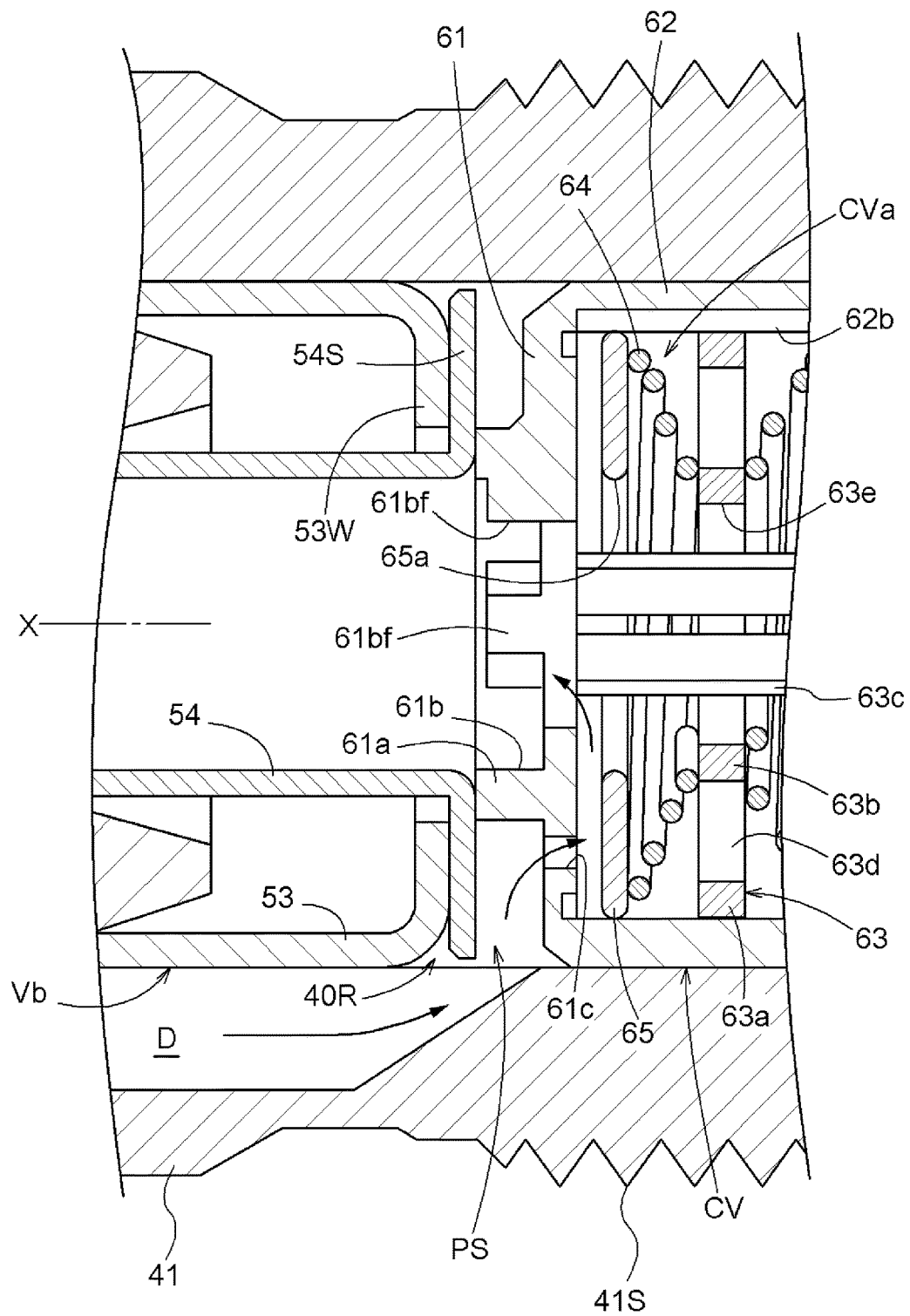
FIG. 6 is an enlarged sectional view illustrating a state in which hydraulic oil flows through a return hole.
Figure 7:
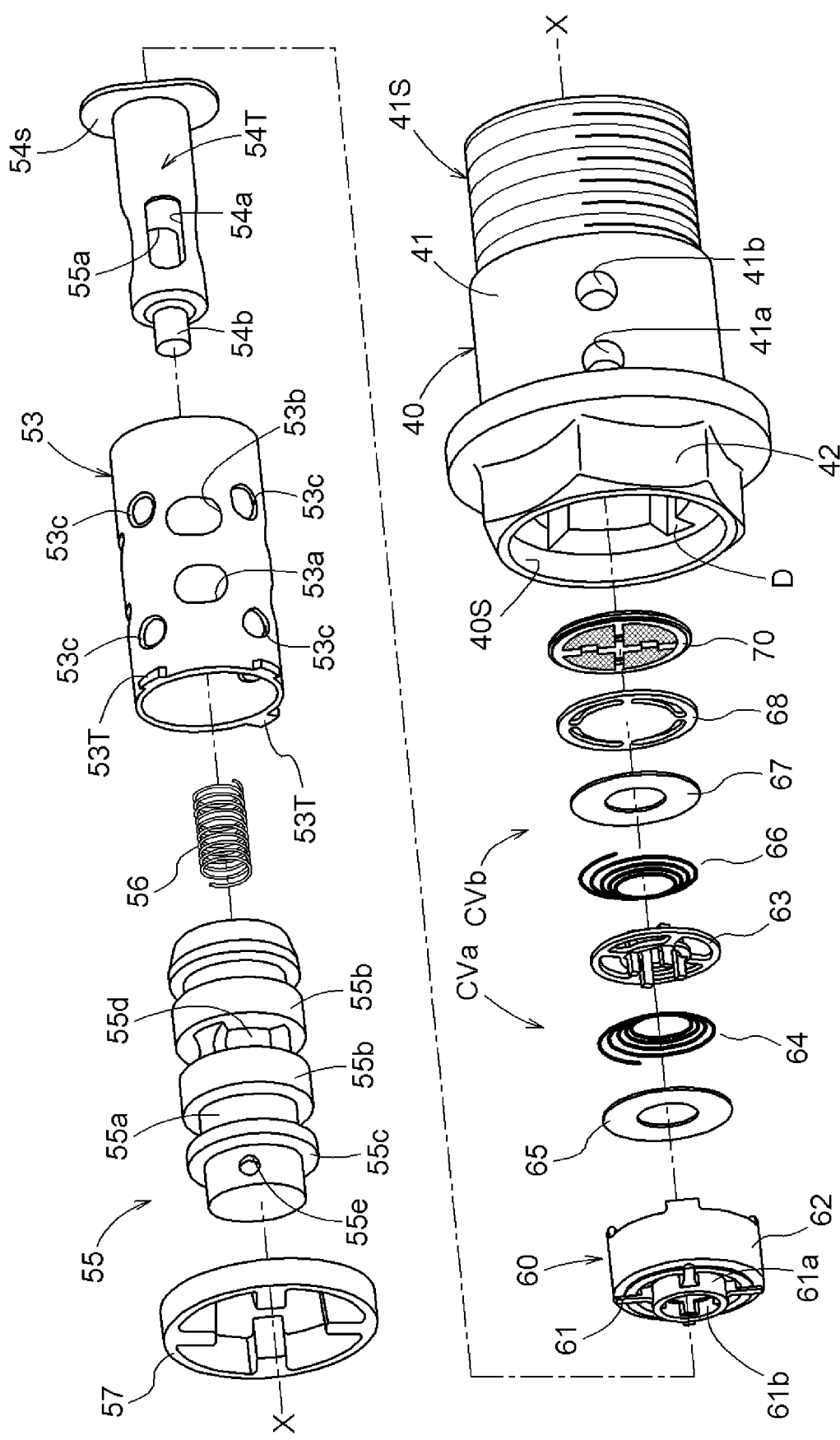
FIG. 7 is an exploded perspective view illustrating a control valve unit and a check valve unit.
Figure 8:
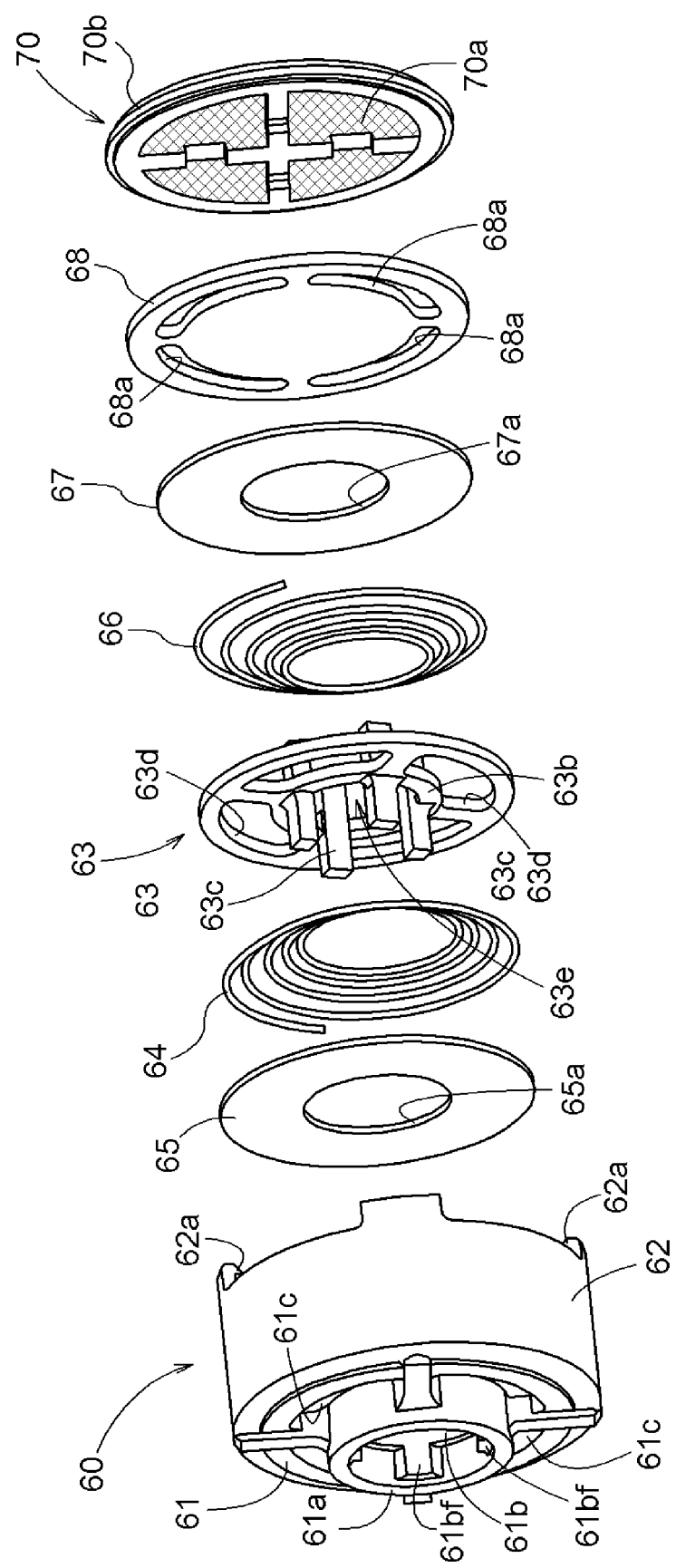
FIG. 8 is an exploded perspective view illustrating the check valve unit.
Figure 9:
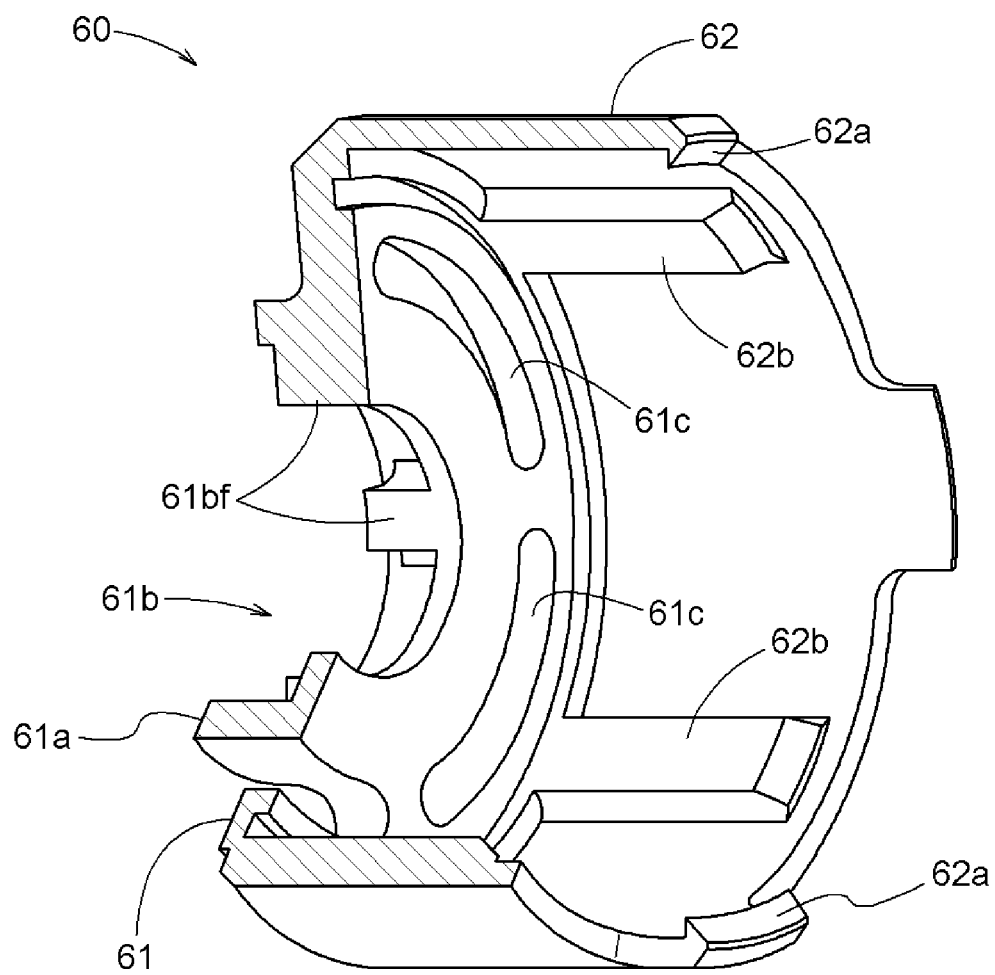
FIG. 9 is a partially cutaway perspective view illustrating a unit case.

In such a configuration, deformation of a portion of the flow passage hole 61b is caused by the pressure acting from the leg portions 63c, and a plurality of ribs 61bf in a posture parallel to the rotation axis X are formed on the inner peripheral surface of the flow passage hole 61b in order to suppress the deformation as illustrated in FIGS. 6, 8, and 9. Each rib 61bf is disposed in an area extending from a portion on which the leg portion 63c abuts to a side opposite to the leg portion 63c.

The outer diameter of the filter member 70 is set to a value that is slightly smaller than the outer wall 62 of the unit case 60. Accordingly, the first spring body 64, the first valve body 65, the spring receiving member 63, the second spring body 66, the second valve body 67, and the valve seat plate 68 are accommodated in the unit case 60. By fitting the filter member 70, the plurality of engagement claw portions 62a are engaged with the outer peripheral portion of the filter member 70, and the filter member 70 closes the opening portion of the unit case 60, so that separation is prevented.

Figure 11:
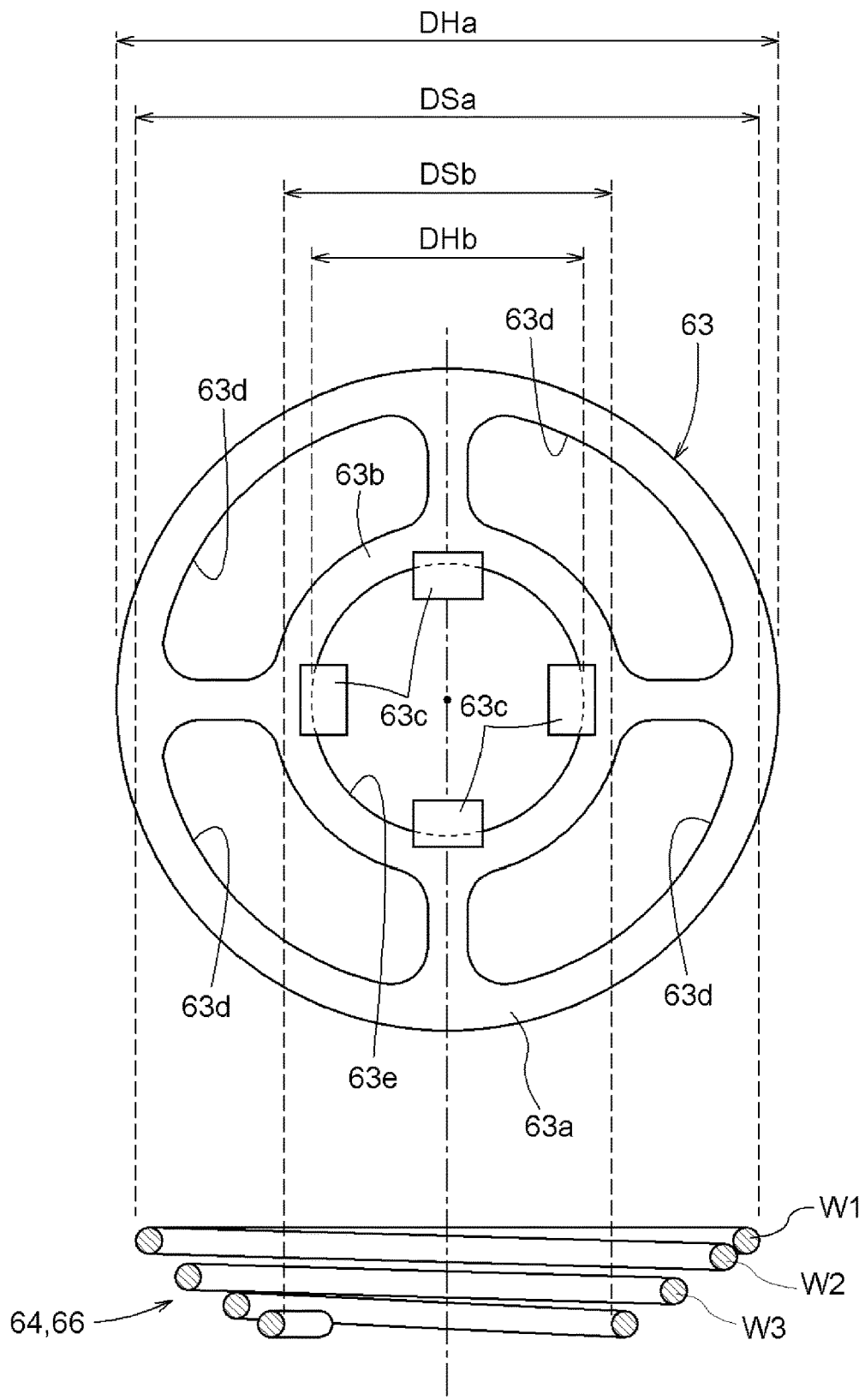
FIG. 11 is a diagram illustrating a dimensional relationship between a spring receiving member and a spring body.

As illustrated in FIGS. 8 and 11, the spring receiving member 63 includes an outer annular portion 63a that is fitted in the inner periphery of the outer wall 62 of the unit case 60, an inner annular portion 63b at a central position, and a plurality of (four) leg portions 63c that each have a rod shape along a flow direction of the hydraulic oil in the supply flow passage R from the inner annular portion 63b. The plurality of leg portions 63c are configured to project from both the front and rear surfaces of the inner annular portion 63b.

In the spring receiving member 63, as illustrated in FIGS. 3 to 5, in a state in which the end portions of the plurality of leg portions 63c are inserted through the first hole portion 65a of the first valve body 65 and the first spring body 64, the spring receiving member 63 abuts on the inner surface (strictly, the inner surface of the annular projection body 61a) of the end wall 61. In a state in which an end portion of the other ends of the plurality of leg portions 63c is inserted through the second hole portion 67a of the second valve body 67 and the second spring body 66, the spring receiving member 63 abuts on a central portion of the valve seat plate 68. Accordingly, the position of the spring receiving member 63 is determined.

Further, in the spring receiving member 63, as illustrated in FIGS. 8 and 11, by connecting the outer annular portion 63a and the inner annular portion 63b to a posture frame along the radial direction, a plurality of opening portions 63d is formed in an outer peripheral portion between the outer annular portion 63a and the inner annular portion 63b, and a central hole portion 63e is formed in an area surrounded by the inner annular portion 63b.

The first spring body 64 and the second spring body 66 have a common structure as a conical spring in which the winding diameter of an elastic wire at one end portion is larger than the winding diameter of the elastic wire at the other end portion in a compression direction.

In particular, in a state in which the first spring body 64 and the second spring body 66 are in a natural length, an interval between the elastic wires at both end portions in the compression direction is set smaller than an interval between the elastic wires in an area except the both end portions. That is, an interval between adjacent two elastic wires at both end portions in the compression direction is set smaller than an interval between adjacent two elastic wires in an area except for both end portions.

As a detailed configuration, as illustrated in FIG. 11, when an end portion side of one of the first spring body 64 and the second spring body 66 is described as an example, two turns of a first winding position W1 where the end portion side is located at one end portion of the elastic wire in the compression direction and a second winding position W2 adjacent thereto are in a positional relationship that is very close in the compression direction. In contrast, an interval between two turns of the second winding position W2 and a third winding position W3 adjacent thereto is set large in the compression direction.

Further, with this configuration, the outer diameter DSa (the maximum diameter) of the outer periphery of the first spring body 64 and the second spring body 66 is set smaller than the outer diameter DHa of the outer annular portion 63a of the spring receiving member 63. Further, the inner diameter DSb (the minimum diameter) of the first spring body 64 and the second spring body 66 is set larger than the inner diameter DHb of the central hole portion 63e of the spring receiving member 63.

In particular, since the first spring body 64 and the second spring body 66 are arranged at positions where the four leg portions 63c of the spring receiving member 63 are inserted therethrough, the inner diameter (the minimum diameter) DSb of the first spring body 64 and the second spring body 66 is a value at which the four leg portions 63c are inserted therethrough.

Control Mode of Hydraulic Oil

In the valve timing controller A, in a state in which electric power is not supplied to the solenoid unit 50 of the electromagnetic unit Va, since a pressing force does not act on the spool 55 from the plunger 51, as illustrated in FIG. 3, the position of the spool 55 is held at an advancement position Pa.

In this advancement position Pa, the stopper portion 55c of the spool 55 abuts on the fixing ring 57 by the urging force of the spool spring 56, the intermediate hole portions 55d of the spool 55 communicate with the advancement communication holes 53a, and the retardation communication holes 53b communicate with a space (the internal space 40R) inside the sleeve 53.

In this advancement position Pa, when the hydraulic oil is supplied from the hydraulic pump P, the hydraulic oil flows to the supply flow passage R via the supply check valve CVb and is supplied to the control valve unit Vb. The hydraulic oil is supplied from the supply port 54a of the fluid supply pipe 54 via the intermediate hole portions 55d of the spool 55, the advancement communication holes 53a, and the advancement port 41a to the advancing chamber Ca.

As a result, the relative rotational phase of the valve timing controller A starts to be displaced in the advancing direction Sa, and the hydraulic oil discharged from the retarding chamber Cb returns from the retardation port 41b to the drain grooves D and is discharged from front end portions of the drain grooves D to the outside. In particular, when the lock mechanism L is in a locked state, a part of the hydraulic oil supplied to the advancing chambers Ca is supplied from the advancement flow passages 33 to the lock mechanism L, and the lock member 25 is separated from the lock recessed portion 23a and is thus unlocked.

When the hydraulic oil flows through the supply flow passage R, as long as the pressure of the pressure space PS does not increase above the pressure of the supply flow passage R, the first valve body 65 of the return check valve CVa is maintained in a closed state.

Next, by supplying predetermined electric power to the solenoid unit 50 of the electromagnetic unit Va, the plunger 51 can project, and the spool 55 can be set to a neutral position Pn illustrated in FIG. 4 against the urging force of the spool spring 56.

When the spool 55 is set to the neutral position Pn, the pair of land portions 55b are in a positional relationship for closing the advancement communication holes 53a and the retardation communication holes 53b of the sleeve 53, the hydraulic oil is not supplied to or discharged from the advancing chambers Ca and the retarding chambers Cb, and a relative rotational phase is maintained.

Further, by supplying electric power exceeding the electric power set to the neutral position Pn to the solenoid unit 50 of the electromagnetic unit Va, the plunger 51 can further project, and the spool 55 can be set to the retardation position Pb illustrated in FIG. 5.

In this retardation position Pb, the intermediate hole portions 55d of the spool 55 communicate with the retardation communication holes 53b, and the advancement communication holes 53a communicate with a space (the internal space 40R) inside the sleeve 53.

In this retardation position Pb, the hydraulic oil that is supplied from the hydraulic pump P flows to the supply flow passage R via the supply check valve CVb and is supplied to the control valve unit Vb. The hydraulic oil is supplied from the supply port 54a of the fluid supply pipe 54 via the intermediate hole portions 55d of the spool 55, the retardation communication holes 53b, and the retardation port 41b to the retarding chambers Cb.

Accordingly, the relative rotational phase of the valve timing controller A starts to be displaced in the retarding direction Sb, and the hydraulic oil discharged from the advancing chambers Ca returns from the advancement port 41a to the drain grooves D and is discharged from the front end portions (the left side of FIG. 5) of the drain grooves D to the outside.

When the hydraulic oil flows through the supply flow passage R, as long as the pressure of the pressure space PS does not increase above the pressure of the supply flow passage R, the first valve body 65 of the return check valve CVa is maintained in a closed state.

In particular, for example, when the spool 55 is switched from the retardation position Pb to the advancement position Pa, while the hydraulic oil is supplied to the advancing chambers Ca in conjunction with the switching, as the relative rotational phase of the valve timing controller A is displaced in the advancing direction Sa, the hydraulic oil having a relatively high pressure flows from the retarding chambers Cb to the drain grooves D. In this way, a phenomenon in which the pressure of the pressure space PS increases occurs even when the spool 55 is switched from the advancement position Pa to the retardation position Pb.

In this way, when the pressure of the pressure space PS communicating with the drain grooves D increases, as illustrated in FIG. 6, the first valve body 65 is separated from the inner wall surface of the end wall 61 due to the pressure. The hydraulic oil is fed into the unit case 60 via the flow passage hole 61b in a form of return (the hydraulic oil flows into the return flow passage). In this way, the fed hydraulic oil and the hydraulic oil flowing in the supply flow passage R can be joined with each other to be supplied to the control valve unit Vb.

When the hydraulic oil returns to the supply flow passage R by such an operation, even in a situation in which the oil amount of the hydraulic oil is reduced, a sufficient amount of the hydraulic oil is supplied to the advancing chambers Ca, and thus rapid displacement of the relative rotational phase is enabled.

Effect of Embodiment

The return check valve CVa includes the end wall 61 (the wall body) in which the return holes 61c (the communication hole) are formed, the first valve body 65, and the first spring body 64. Thus, when the pressure of the pressure space PS increases above the pressure inside the unit case 60, the first valve body 65 opens the return holes 61c, so that the hydraulic oil that returns when the phase of the valve timing controller A is changed can be reused.

In the valve timing controller A, since the same structure can be used as the first spring body 64 of the return check valve CVa and the second spring body 66 of the supply check valve CVb constituting the check valve unit CV, costs can be reduced. Similarly, the same structure can be used for the first valve body 65 and the second valve body 67. Accordingly, the costs can be reduced.

Further, since the first spring body 64 is configured as a conical spring, for example, the contact length of the first spring body 64 can be shortened as compared to a coil spring, a space for accommodating the first spring body 64 in the unit case 60 can be reduced, the unit case 60 can be downsized, and the valve timing controller A can be downsized.

Further, since the supply check valve CVb having a structure that is basically the same as that of the return check valve CVa is accommodated in the unit case 60, and the second spring body 66 constituting the return check valve CVa is also configured as a conical spring, the unit case 60 can be further downsized.

As illustrated in FIG. 11, since the outer diameter DHa of the spring receiving member 63 is larger than the outer diameter DSa of the first spring body 64 where the winding diameter is the maximum, the outer periphery of the first spring body 64 cannot be strongly brought into contact with the inner periphery of the unit case 60, and a force from the first spring body 64 can be properly received by the spring receiving member 63.

Since the inner diameter DSb of the first spring body 64 where the winding diameter is the minimum is larger than the inner diameter DHb of the central hole portion 63e of the spring receiving member 63, even when these components are arranged in a positional relationship in which the components are in contact with each other, there is no inconvenience that a portion of the first spring body 64 having a small winding diameter is fitted in the central hole portion 63e. Further, with this configuration, the first spring body 64 can be set in a reverse posture.

The interval between the adjacent two elastic wires at the both end portions of the first spring body 64 in a natural state in the compression direction is set smaller than the interval between the adjacent two elastic wires in the area except for the both end portions. Accordingly, for example, in a process of assembling a check valve, even in a state in which a plurality of the first spring bodies 64 are accommodated in a case or the like, entanglement of the spring bodies can be suppressed, and the assembling is facilitated.

Other Embodiments

The embodiment disclosed here may be configured as follows in addition to the above-described embodiment (those having the same functions as the embodiment are designated by the same numbers and symbols as those of the embodiment).

Figure 12:
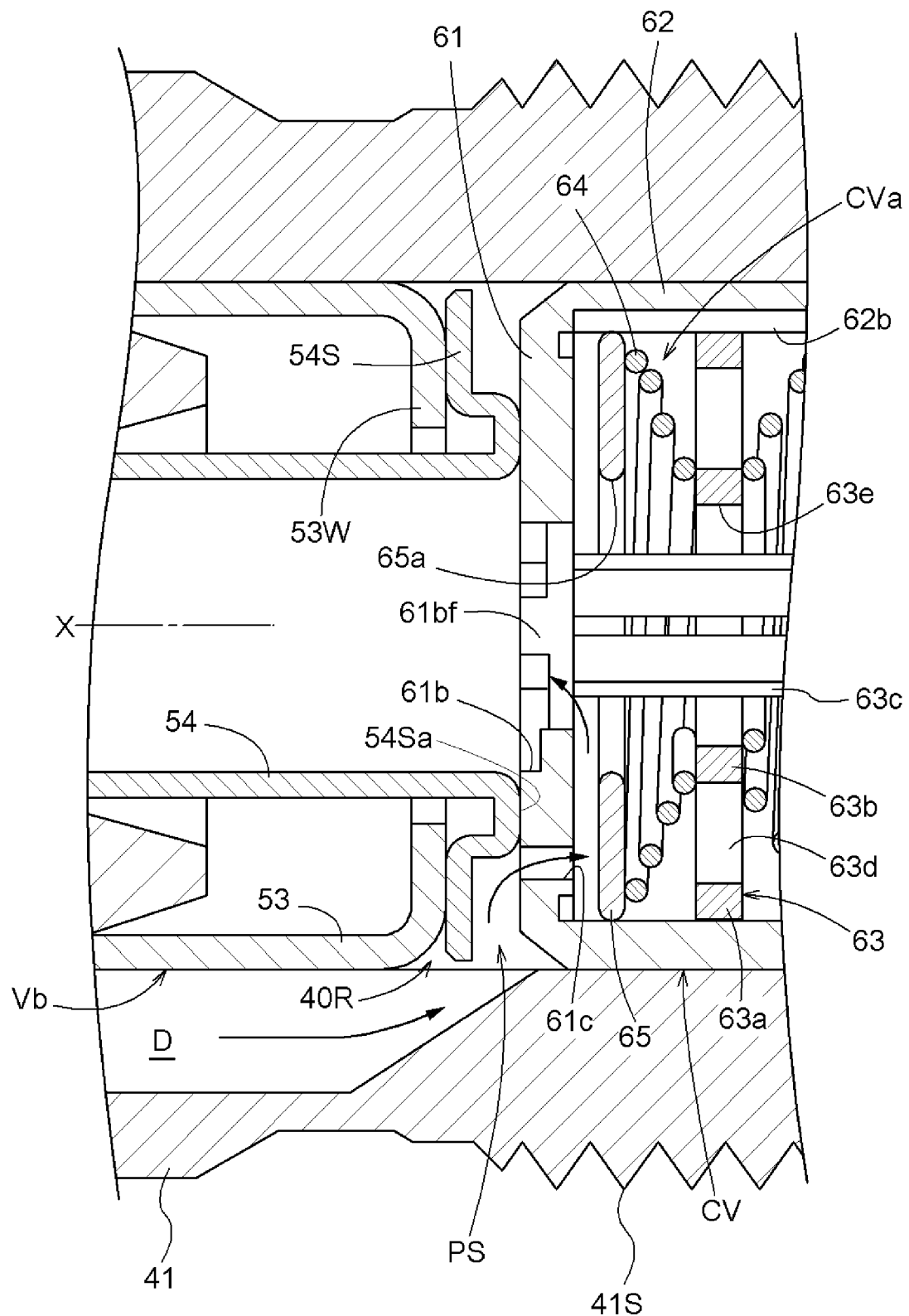
FIG. 12 is a sectional view illustrating a proximal end portion and an end wall of a fluid pipe path portion of another embodiment (a).

(a) Instead of a configuration in which the projection body 61a (see FIG. 3) is formed on the end wall 61 (the wall body) of the unit case 60 of the embodiment, as illustrated in FIG. 12, a bulging portion 54Sa is formed such that a part of the flange-like proximal end portion 54S of the fluid supply pipe 54 projects toward the end wall 61.

In the another embodiment (a), the end wall 61 (the wall body) is formed in a flat surface that is perpendicular to the rotation axis X, and the bulging portion 54Sa is formed at this portion, so that the pressure space PS can be formed in a gap between the control valve unit Vb and the check valve unit CV. When the pressure of the pressure space PS increases, similar to the above embodiment, the first valve body 65 can open the return hole 61c against the urging force of the first spring body 64, and the hydraulic oil from the pressure space PS can flow into the unit case 60.

(b) Similar to the embodiment, in any one of cases such as a case where the pressure space PS is formed as the projection body 61a is formed on the end wall 61 (the wall body) and a case where the pressure space PS is formed as the bulging portion 54Sa is provided in the proximal end portion 54S of the fluid supply pipe 54 as in another embodiment (a), a communication hole connecting a space communicating with the drain grooves D and the pressure space PS inside the control valve unit Vb is formed to penetrate the end portion wall 53W of the sleeve 53 and the proximal end portion 54S of the fluid supply pipe 54.

When the communication hole is formed in this manner, it is not necessary to allow the drain grooves D to communicate with the pressure space PS. However, the drain grooves D may communicate with the pressure space PS.

(c) As a spring body serving as a conical spring, the interval between the adjacent two elastic wires in an intermediate position in the compression direction is smaller than the interval between the adjacent two elastic wires at end portions in the compression direction. In the above-configured spring body, the interval between the elastic wires at the intermediate portion is smaller than the interval between the elastic wires at the both ends in the compression direction. Thus, for example, even in a state in which a plurality of the spring bodies are accommodated in the case, a phenomenon in which a part of the elastic wire constituting the spring body is forcibly input to a gap between the adjacent elastic wires of the spring body can be suppressed.

(d) In the embodiment, the male screw portion 41S formed on the bolt body 41 of the connection bolt 40 is screwed into the female screw portion 5S of the intake camshaft 5, so that the bolt body 41 is fixed to the intake camshaft 5. However, the check valve unit CV and the control valve unit Vb are arranged coaxially with the rotation axis X without using a configuration that performs fixing by screwing.

An example of the configuration of the another embodiment (d), a cylindrical member that has a flange portion at an outer end position and can be disposed coaxially with the rotation axis X is used. The check valve unit CV and the control valve unit Vb are accommodated inside the cylindrical member, and the cylindrical member is disposed at the same position as the bolt body 41 of the embodiment. In this state, a configuration is conceived in which the cylindrical member is fixed by screwing a plurality of screws inserted through the flange portion into the front plate 22.

Accordingly, the cylindrical member may be fixed at the same position as that of the bolt body 41, and the check valve unit CV and the control valve unit Vb may be arranged coaxially with the rotation axis X. As a configuration for fixing the cylindrical member to the front plate 22 or the like, for example, a configuration may be adopted in which a bracket that is non-rotatable with respect to the outer end portion of a cylindrical body and non-movable in the direction along the rotation axis X is used, and the bracket is fixed to the front plate 22 using a plurality of screws of the like.

The embodiments disclosed here can be used in a valve timing controller that sets a relative rotational phase by controlling the fluid.

A feature of a valve timing controller according to an aspect of this disclosure resides in that the valve timing controller includes: a driving-side rotating body that rotates in synchronization with a crankshaft of an internal combustion engine; a driven-side rotating body that is disposed coaxially with a rotation axis of the driving-side rotating body and rotates integrally with a valve opening and closing camshaft; an advancing chamber and a retarding chamber formed between the driving-side rotating body and the driven-side rotating body; a control valve unit that controls supply and discharge of a fluid to and from the advancing chamber and the retarding chamber; and a check valve unit that is disposed upstream of the control valve unit in a supply flow passage through which the fluid is supplied to the control valve unit, in which, a pressure space is provided between the control valve unit and the check valve unit, the control valve unit has a flow passage structure in which a spool is accommodated to be movable coaxially with the rotation axis, and when the spool is manipulated, while the fluid is supplied to one of an advancement port and a retardation port, the fluid returning from the other one of the advancement port and the retardation port is discharged to the outside, and at the same time, at least a part of the fluid to be discharged to the outside is supplied to the pressure space, and the check valve unit includes, therein, a supply flow passage through which the fluid from a fluid source is supplied to the control valve unit, and includes a return check valve which enables supply of the fluid in the pressure space to the supply flow passage in the check valve unit as the pressure of the pressure space increases.

According to this characteristic configuration, the spool is manipulated, the fluid is sent out to one of the advancement port and the retardation port, and a part of the fluid returning from the other one of the advancement port and the retardation port is supplied to the pressure space. In this way, when the pressure of the pressure space to which the fluid is supplied increases, the return check valve allows flow of the fluid into the check valve unit.

That is, in this configuration, since the control valve unit and the check valve unit can be arranged in parallel in a direction along the rotation axis of the valve timing controller, the pressure space can be formed without increasing the diameter of the control valve unit or complicating the control valve unit. Further, the return check valve is disposed at a position adjacent to the pressure space. Thus, when the return check valve is opened, the fluid in the pressure space can be supplied from the inside of the check valve unit to the control valve unit adjacent to the check valve unit at the shortest distance.

Therefore, the valve timing controller which can reuse the fluid by using a check valve can be configured in a small size.

As another configuration, the spool may be provided with an internal flow passage formed along the rotation axis and a hole portion through which the fluid is sent from the internal flow passage to an outer surface of the spool, the control valve unit may include a fluid supply pipe which is inserted into the internal flow passage of the spool for supplying the fluid from the supply flow passage to the internal flow passage of the spool and a flange-like proximal end portion may be formed at an upstream end portion of the fluid supply pipe in a fluid supply direction, the check valve unit may include a wall body at a position in contact with the pressure space, and a projection body which is formed to protrude from a central portion surrounding the supply flow passage in the wall body toward the proximal end portion and abut on the proximal end portion, the pressure space may be defined by the proximal end portion, the wall body, and the projection body, and the return check valve may include a return hole formed in the wall body, a first valve body which opens and closes the return hole, and a first spring body which urges the first valve body in a direction in which the return hole is closed.

Accordingly, as the projection body abuts on a flange portion, the pressure space can be formed in an area surrounded by the proximal end portion, the wall body, and the projection body between the control valve unit and the check valve unit. Further, a first check valve can be configured by the return hole of the wall body of the return check valve, the first valve body which opens and closes the return hole, and the first spring body. In this configuration, when the first check valve of the check valve unit is opened, it is possible to supply the fluid from the pressure space to the supply flow passage inside the check valve unit, and join the fluid sent through the supply flow passage.

As another configuration, the first spring body may be configured as a conical spring.

Accordingly, since the first spring body is configured as a conical spring, for example, the contact length of the first spring can be shortened as compared with a coil spring, a space where the first spring body is accommodated in the unit case can be reduced, the unit case can be downsized, and the valve timing controller can be also downsized.

As another configuration, the check valve unit may have an outer wall extending from an outer periphery of the wall body toward an upstream side of the supply flow passage, and the first valve body, the first spring body, and a filter member that removes foreign matters contained in the fluid may be accommodated in an area surrounded by the wall body and the outer wall.

Accordingly, since the check valve unit is configured with the wall body and the outer wall, the first valve body and the first spring body can be arranged inside the check valve unit, dust or the like contained in the fluid supplied from the fluid source can be removed by the filter member, and the fluid from which the dust or the like is removed can be supplied to the control valve unit.

As another configuration, the check valve unit may include a supply check valve having, on an upstream side of the supply flow passage with reference to the return check valve, a valve seat plate in which a flow hole is formed, a second valve body which opens and closes the flow hole, and a second spring body which urges the second valve body in a direction in which the flow hole is closed, and a spring receiving member which receives a reaction force of an urging force by which the first spring body urges the first valve body and a reaction force of an urging force by which the second spring body urges the second valve body may be disposed in an intermediate position between the return check valve and the supply check valve.

Accordingly, in a case where the pressure of the fluid on a fluid source side is relatively lower than the pressure of the fluid on a control valve unit side, such as a case where the pressure of the fluid supplied from the fluid source is lowered, the second valve body is closed by the urging force of the second spring body, to block the flow of the fluid. Further, as the spring receiving member is provided in the check valve unit, it is possible to receive a reaction force when the first spring body that urges the check valve and the second spring body that urges the supply check valve are urged.

As another configuration, the spring receiving member may have a leg portion extending along the rotation axis, one end portion of the leg portion may abut on the wall body, and the other end portion of the leg portion may abut on the valve seat plate.

Accordingly, since the positions of both ends of the leg portion are determined, the position of the spring receiving member can be determined, and the urging forces of the first spring body and the second spring body can be properly maintained.

As another configuration, the second spring body may be configured as a conical spring.

Accordingly, since the second spring body is configured as a conical spring, for example, the contact length of the second spring can be shortened as compared with a coil spring, a space where the second spring body is accommodated in the unit case can be reduced, the unit case can be downsized, and the valve timing controller can be also downsized.

As another configuration, a flow passage hole that enables flow of the fluid is formed at a center of the wall body, and a rib extending from a portion on which the leg portion abuts on an inner peripheral surface of the flow passage hole to an opposite side of the leg portion may be formed.

Accordingly, when the pressure is applied to the wall body from the leg portion of the spring receiving member, as the rib receives the pressure, the flow passage hole at the center of the wall body is not deformed and the position of the spring receiving member is not changed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A valve timing controller comprising:
a driving-side rotating body that rotates in synchronization with a crankshaft of an internal combustion engine;
a driven-side rotating body that is disposed coaxially with a rotation axis of the driving-side rotating body and rotates integrally with a valve opening and closing camshaft;
an advancing chamber and a retarding chamber formed between the driving-side rotating body and the driven-side rotating body;

a control valve unit that controls supply and discharge of a fluid to and from the advancing chamber and the retarding chamber; and a check valve unit that is disposed upstream of the control valve unit, wherein a pressure space is provided between the control valve unit and the check valve unit, the control valve unit has a flow passage structure in which a spool is accommodated to be movable coaxially with the rotation axis, and when the spool is manipulated, while the fluid is supplied to one of an advancement port and a retardation port, the fluid returning from the other one of the advancement port and the retardation port is discharged from the control valve unit to an outside, and at the same time, at least a part of the fluid to be discharged to the outside is supplied to the pressure space, the check valve unit includes, therein, a supply flow passage through which the fluid from a fluid source is supplied to the control valve unit, and includes a return check valve which enables supply of the fluid in the pressure space to the supply flow passage in the check valve unit as a pressure of the pressure space increases, the spool is provided with an internal flow passage formed along the rotation axis and a hole portion through which the fluid is sent from the internal flow passage to an outer surface of the spool, the control valve unit includes a fluid supply pipe which is inserted into the internal flow passage of the spool for supplying the fluid from the supply flow passage to the internal flow passage of the spool and a flange-like proximal end portion is formed at an upstream end portion of the fluid supply pipe in a fluid supply direction, the check valve unit includes a wall body at a position in contact with the pressure space, and a projection body which is formed to protrude from a central portion surrounding the supply flow passage in the wall body toward the flange-like proximal end portion and abut on the flange-like proximal end portion, the pressure space is defined by the flange-like proximal end portion, the wall body, and the projection body, and the return check valve includes a return hole formed in the wall body, a first valve body which opens and closes the return hole, and a first spring body which urges the first valve body in a direction in which the return hole is closed.

2. The valve timing controller according to claim 1, wherein the first spring body is configured as a conical spring.

3. The valve timing controller according to claim 1, wherein the check valve unit has an outer wall extending from an outer periphery of the wall body toward an upstream side of the supply flow passage, and the first valve body, the first spring body, and a filter member that removes foreign matters contained in the fluid are accommodated in an area surrounded by the wall body and the outer wall.

4. The valve timing controller according to claim 3, wherein the check valve unit includes a supply check valve having, on an upstream side of the supply flow passage with reference to the return check valve, a valve seat plate in which a flow hole is formed, a second valve body which opens and closes the flow hole, and a second spring body which urges the second valve body in a direction in which the flow hole is closed, and a spring receiving member which receives a reaction force of an urging force by which the first spring body urges the first valve body and a reaction force of an urging force by which the second spring body urges the second valve body is disposed in an intermediate position between the return check valve and the supply check valve.

5. The valve timing controller according to claim 4, wherein the spring receiving member has a leg portion extending along the rotation axis, one end portion of the leg portion abuts on the wall body, and an other end portion of the leg portion abuts on the valve seat plate.

6. The valve timing controller according to claim 5, wherein a flow passage hole that enables flow of the fluid is formed at a center of the wall body, and a rib extending from a portion on which the leg portion abuts on an inner peripheral surface of the flow passage hole to an opposite side of the leg portion is formed.

7. The valve timing controller according to claim 4, wherein the second spring body is configured as a conical spring.

8. A valve timing controller comprising:

a driving-side rotating body that rotates in synchronization with a crankshaft of an internal combustion engine;

a driven-side rotating body that is disposed coaxially with a rotation axis of the driving-side rotating body and rotates integrally with a valve opening and closing camshaft;

an advancing chamber and a retarding chamber formed between the driving-side rotating body and the driven-side rotating body;

a control valve unit that controls supply and discharge of a fluid to and from the advancing chamber and the retarding chamber; and a check valve unit that is disposed upstream of the control valve unit, wherein a pressure space is provided between the control valve unit and the check valve unit, the control valve unit has a flow passage structure in which a spool is accommodated to be movable coaxially with the rotation axis, and when the spool is manipulated, while the fluid is supplied to one of an advancement port and a retardation port, the fluid returning from the other one of the advancement port and the retardation port is discharged from the control valve unit to an outside, and at the same time, at least a part of the fluid to be discharged to the outside is supplied to the pressure space, the check valve unit includes, therein, a supply flow passage through which the fluid from a fluid source is supplied to the control valve unit, and includes a return check valve which enables supply of the fluid in the pressure space to the supply flow passage in the check valve unit as a pressure of the pressure space increases, the spool is provided with an internal flow passage formed along the rotation axis and a hole portion through which the fluid is sent from the internal flow passage to an outer surface of the spool, the control valve unit includes a fluid supply pipe which is inserted into the internal flow passage of the spool for supplying the fluid from the supply flow passage to the internal flow passage of the spool and a flange-like proximal end portion is formed at an upstream end portion of the fluid supply pipe in a fluid supply direction, the pressure space is disposed on a side of the flange-like proximal end portion opposite the spool.

9. A valve timing controller comprising:

a driving-side rotating body that rotates in synchronization with a crankshaft of an internal combustion engine;

a driven-side rotating body that is disposed coaxially with a rotation axis of the driving-side rotating body and rotates integrally with a valve opening and closing camshaft;

an advancing chamber and a retarding chamber formed between the driving-side rotating body and the driven-side rotating body;

a control valve unit that controls supply and discharge of a fluid to and from the advancing chamber and the retarding chamber; and a check valve unit that is disposed upstream of the control valve unit, wherein, a pressure space is provided between the control valve unit and the check valve unit, the control valve unit has a flow passage structure in which a spool is accommodated to be movable coaxially with the rotation axis, and when the spool is manipulated, while the fluid is supplied to one of an advancement port and a retardation port, the fluid returning from the other one of the advancement port and the retardation port is discharged from the control valve unit to an outside, and at the same time, at least a part of the fluid to be discharged to the outside is supplied to the pressure space, the check valve unit includes, therein, a supply flow passage through which the fluid from a fluid source is supplied to the control valve unit, the spool is provided with an internal flow passage formed along the rotation axis and a hole portion through which the fluid is sent from the internal flow passage to an outer surface of the spool, the control valve unit includes a fluid supply pipe which is inserted into the internal flow passage of the spool for supplying the fluid from the supply flow passage to the internal flow passage of the spool and a flange-like proximal end portion is formed at an upstream end portion of the fluid supply pipe in a fluid supply direction, and the pressure space is disposed on a side of the flange-like proximal end portion opposite the spool.

* * * * *